United States Patent
Friedlander et al.

(10) Patent No.: US 12,216,459 B2
(45) Date of Patent: Feb. 4, 2025

(54) SYSTEM AND METHOD FOR INFERRING DEVICE TYPE BASED ON PORT USAGE

(71) Applicant: Armis Security Ltd., Tel Aviv-Jaffa (IL)

(72) Inventors: Yuval Friedlander, Petah-Tiqwa (IL); Gil Ben Zvi, Hod Hasharon (IL); Tom Hanetz, Tel Aviv (IL); Ron Shoham, Tel Aviv (IL)

(73) Assignee: Armis Security Ltd., Tel Aviv-Jaffa (IL)

( * ) Notice: Subject to any disclaimer, the term of this patent is extended or adjusted under 35 U.S.C. 154(b) by 511 days.

(21) Appl. No.: 17/523,362

(22) Filed: Nov. 10, 2021

(65) Prior Publication Data

US 2023/0143024 A1    May 11, 2023

(51) Int. Cl.
| | | |
|---|---|---|
| *G05B 19/418* | (2006.01) | |
| *G06F 18/214* | (2023.01) | |
| *G06N 5/04* | (2023.01) | |
| *H04L 9/40* | (2022.01) | |

(52) U.S. Cl.
CPC ..... *G05B 19/41885* (2013.01); *G06F 18/214* (2023.01); *G06N 5/04* (2013.01); *H04L 63/1425* (2013.01)

(58) Field of Classification Search
CPC ...... G06N 5/04; G06N 20/20; H04L 63/1425; G05B 19/41885; G06F 18/214
See application file for complete search history.

(56) References Cited

U.S. PATENT DOCUMENTS

| | | |
|---|---|---|
| 8,732,732 B2 | 5/2014 | Meijer et al. |
| 10,320,619 B2 | 6/2019 | Seddigh et al. |
| 10,419,931 B1 * | 9/2019 | Sohail ............... H04L 63/1425 |
| 2018/0124096 A1 * | 5/2018 | Schwartz ............ H04W 8/22 |

(Continued)

FOREIGN PATENT DOCUMENTS

| | | |
|---|---|---|
| CN | 107667505 B | 12/2020 |
| WO | WO 2020/136635 | 7/2020 |

OTHER PUBLICATIONS

Noguchi, Hirofumi, Misao Kataoka, and Yoji Yamato. "Device identification based on communication analysis for the internet of things." IEEE Access 7 (2019): 52903-52912. (Year: 2019).*

(Continued)

*Primary Examiner* — Abiy Getachew
*Assistant Examiner* — Calvin Thanh Nguyen
(74) *Attorney, Agent, or Firm* — Perkins Coie LLP

(57) ABSTRACT

A system and method for inferring device types. A method includes selecting a device type inference model from among a plurality of device type inference models based on a manufacturer of a device, wherein each device type inference model corresponds to a respective manufacturer and is trained using training data of devices manufactured by the respective manufacturer, wherein each device type inference model is trained to output a device type prediction; and determining an inferred device type for the device, wherein determining the inferred device type for the device further comprises applying the selected device type inference model to a plurality of features, wherein the plurality of features is extracted from device activity data indicating ports used by the device and at least one volume of traffic communicated via each port used by the device.

17 Claims, 4 Drawing Sheets

(56) References Cited

U.S. PATENT DOCUMENTS

2018/0270229 A1\* 9/2018 Zhang ................ H04L 69/22
2021/0329029 A1\* 10/2021 Vasseur ............... H04L 43/065

OTHER PUBLICATIONS

Creager, "How can anomalous IoT device activity be detected?," Jul. 17, 2018, retrieved from https://www.techtarget.com/iotagenda/blog/IoT-Agenda/How-can-anomalous-IoT- device-activity-be-detected, 3 pages.
International Search Report and Written Opinion from PCT/IB2022/060648, dated Jan. 18, 2023, 7 pages.

\* cited by examiner

SYSTEM AND METHOD FOR INFERRING DEVICE TYPE BASED ON PORT USAGE

TECHNICAL FIELD

The present disclosure relates generally to device profiling for cybersecurity, and more specifically to resolving device type based on traffic behavior.

BACKGROUND

Cybersecurity is the protection of information systems from theft or damage to the hardware, to the software, and to the information stored in them, as well as from disruption or misdirection of the services such systems provide. Cybersecurity is now a major concern for virtually any organization, from business enterprises to government institutions. Hackers and other attackers attempt to exploit any vulnerability in the infrastructure, hardware, or software of the organization to execute a cyber-attack. There are additional cybersecurity challenges due to high demand for employees or other users of network systems to bring their own devices, the dangers of which may not be easily recognizable.

To protect networked systems against malicious entities accessing the network, some existing solutions attempt to profile devices accessing the network. Such profiling may be helpful for detecting anomalous activity and for determining which cybersecurity mitigation actions are needed for activity of a given device. Providing accurate profiling is a critical challenge to proper risk assessment and to ensuring that appropriate mitigation actions are taken. The challenge involved with profiling a user device is magnified by the fact there is no industry standard for querying and/or obtaining information from user devices, user devices, and so on.

Among information relevant to profiling, the type of device can be used to identify when a device is acting abnormally as compared to other devices of the same type. Different types of devices tend to behave differently in a manner that is somewhat predictable such that abnormal activity can be identified by comparing device behavior to that of other devices having the same device type. For example, servers tend to behave similarly to each other in at least some respects, but servers tend to behave differently from personal computers in many respects. To this end, knowledge of device types is desirable. However, the device type may not be explicitly identified in data from the device or may be identified but not in a uniformly recognized format.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for inferring device types. The method comprises: selecting a device type inference model from among a plurality of device type inference models based on a manufacturer of a device, wherein each device type inference model corresponds to a respective manufacturer and is trained using training data of devices manufactured by the respective manufacturer, wherein each device type inference model is trained to output a device type prediction; and determining an inferred device type for the device, wherein determining the inferred device type for the device further comprises applying the selected device type inference model to a plurality of features, wherein the plurality of features is extracted from device activity data indicating ports used by the device and at least one volume of traffic communicated via each port used by the device.

Certain embodiments disclosed herein also include a non-transitory computer readable medium having stored thereon causing a processing circuitry to execute a process, the process comprising: selecting a device type inference model from among a plurality of device type inference models based on a manufacturer of a device, wherein each device type inference model corresponds to a respective manufacturer and is trained using training data of devices manufactured by the respective manufacturer, wherein each device type inference model is trained to output a device type prediction; and determining an inferred device type for the device, wherein determining the inferred device type for the device further comprises applying the selected device type inference model to a plurality of features, wherein the plurality of features is extracted from device activity data indicating ports used by the device and at least one volume of traffic communicated via each port used by the device.

Certain embodiments disclosed herein also include a system for inferring device types. The system comprises: a processing circuitry; and a memory, the memory containing instructions that, when executed by the processing circuitry, configure the system to: select a device type inference model from among a plurality of device type inference models based on a manufacturer of a device, wherein each device type inference model corresponds to a respective manufacturer and is trained using training data of devices manufactured by the respective manufacturer, wherein each device type inference model is trained to output a device type prediction; and determine an inferred device type for the device, wherein determining the inferred device type for the device further comprises applying the selected device type inference model to a plurality of features, wherein the plurality of features is extracted from device activity data indicating ports used by the device and at least one volume of traffic communicated via each port used by the device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
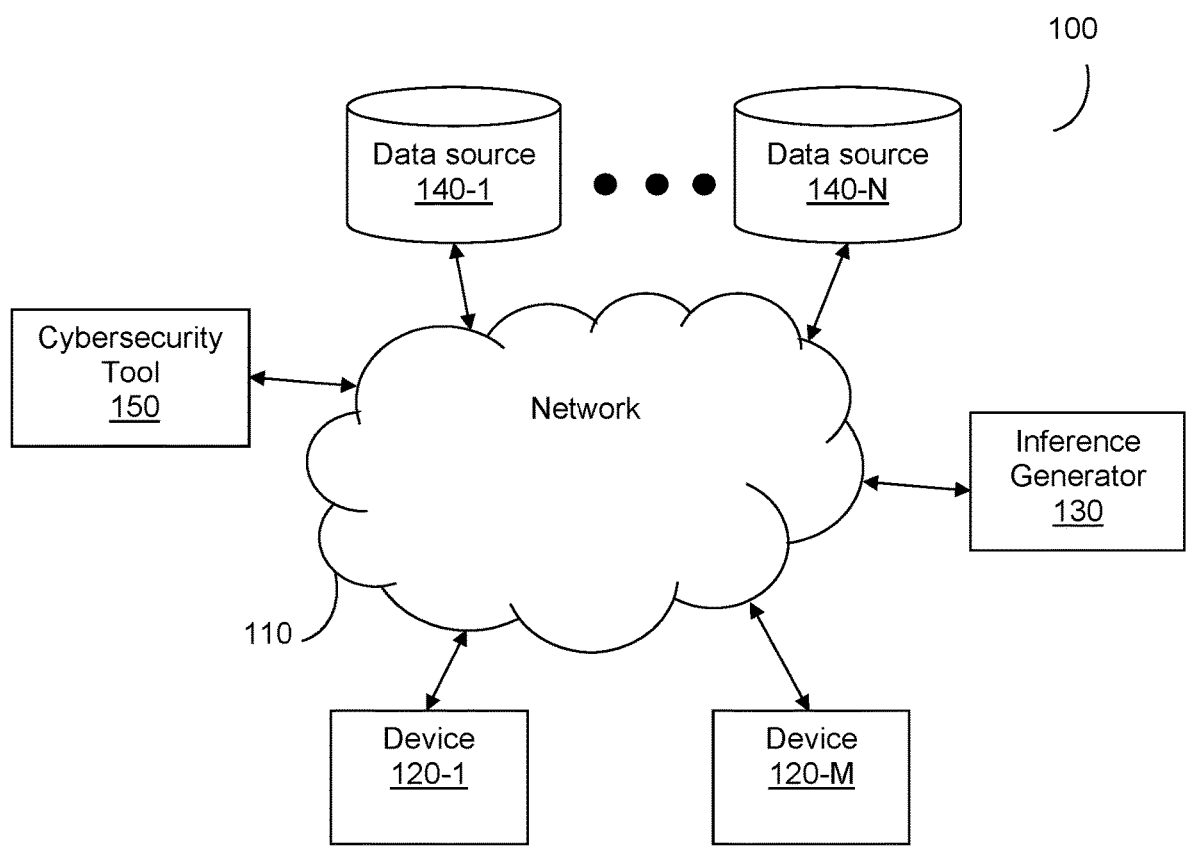
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Data required for cybersecurity purposes may not be explicitly included in incoming or outgoing data streams. In particular, it has been identified that device type, which is useful for predicting normal device activity, is often not indicated in data, or the data may not be formatted in a way that clearly and consistently indicates the device type. This may occur, for example, when there is partial coverage of network data or partial coverage due to sampled traffic data. Further, it has been identified that reliance on rules-based mechanisms, which some existing solutions utilize to determine device types, yields only somewhat reliable results and may not cover all device types. Additionally, rules used by such mechanisms are specific to particular device types and therefore require manual definition, tuning, and maintenance, as device type information is updated or new types of devices are introduced. Such manual definition, tuning, and maintenance are cumbersome and cannot be effectively scaled.

In this regard, it has been identified that devices having the same type tend to demonstrate similar behavior with respect to ports such that port usage behavior for different device types can be effectively learned via machine learning. More specifically, devices of the same device type tend to use different ports for different volumes of traffic and, as a result, port usage demonstrates statistical significance that can be leveraged to identify the device type of a device based on how it uses ports. Accordingly, the disclosed embodiments include techniques for inferring device type based on port usage via machine learning. Specifically, the disclosed embodiments infer device types based on ports used by a given device and the volumes of traffic those ports are used for.

It has further been identified that the manufacturer of a device can be used to narrow down the potential device types for a device in order to more accurately infer device type. Specifically, manufacturer tends to be indicated explicitly more often than device type, and manufacturer values can be effectively normalized in order to have reasonable certainty that the manufacturer of a given device is determined accurately and uniquely (i.e., such that different manufacturer values representing the same real-world entity are identified as related to that same real-world entity). Further, manufacturers tend to only make certain types of devices, which means that the potential set of device types to be considered given a particular manufacturer is usually smaller than the set of all potential device types.

As a non-limiting example, a manufacturer "ABC Manufacturing" may make only smartphones, tablets, and personal computers, such that the possible device types for a device manufactured by ABC Manufacturing are limited to smartphones, tablets, and personal computers. Other devices, such as servers and medical devices, may therefore be excluded from consideration once the manufacturer of the device is known to be made by ABC Manufacturing. Further, different manufacturer values representing ABC manufacturing may be used to determine that the device is made by ABC manufacturing. For example, different values that represent ABC Manufacturing may include "ABC, Inc.," "ABC," "Abc," "ABC Manufacturing," "ABC Manufacturing Co.," "ABC Man. Co." and the like.

The various disclosed embodiments include a method and system for inferring device types based on port usage. Device type inference models are trained for different potential manufacturers. Each device type inference model is trained using training device activity data for devices of a respective manufacturer, and is trained to output a device type prediction for a device when applied to features extracted from application device activity data. As a non-limiting example, each device type inference model may be a classifier trained to output a classification representing a respective device type. More specifically, the device type inference models are trained and applied using port usage features such as ports used by a device and volume of traffic each port is used for.

When a device type inference for a device is desired, device activity data for the device is preprocessed and processed. Based on the processed device activity data, port usage distributions may be determined. Features are extracted from the device activity data. The extraction may be based further on the port usage distributions.

Based on a manufacturer of the device (e.g., a manufacturer indicated in the device activity data or determined based on the device activity data), one of the trained device type inference models is selected. Specifically, a device type inference model associated with the manufacturer of the device is selected. The selected device type inference model is applied to the extracted features in order to output an inferred device type.

The inferred device type may be added to a device profile for the device in order to enrich that device profile. Further, using the inferred device type, activity of the device may be monitored in order to detect abnormal behavior. When abnormal behavior of the device is identified, mitigation actions may be performed in order to mitigate the anomalous behavior.

The disclosed embodiments allow for enriching device data with information that is not explicitly included therein. Further, the disclosed embodiments provide techniques that improve the accuracy of device type inferences. The disclosed embodiments include techniques for selecting models to be applied based on manufacturer of a device as well as techniques for determining and contrasting port usage distributions, both of which can be utilized to more accurately infer device type in order to ensure that the device types used as enrichment data are more accurate.

FIG. 1 shows an example network diagram 100 utilized to describe the various disclosed embodiments. In particular, FIG. 1 shows an example network configuration used when applying the machine learning models described herein. In the example network diagram 100, one or more devices 120-1 through 120-M (hereinafter referred to individually as a device 120 and collectively as devices 120, merely for simplicity purposes), an inference generator 130, and a plurality of data sources 140-1 through 140-N (hereinafter referred to individually as a data source 140 and collectively as data sources 140, merely for simplicity purposes) are communicatively connected via a network 110.

The network 110 may be, but is not limited to, a wireless, cellular or wired network, a local area network (LAN), a wide area network (WAN), a metro area network (MAN), the Internet, the worldwide web (WWW), similar networks, and any combination thereof.

Each device 120 may be, but is not limited to, a mobile phone (e.g., a smartphone), laptop computer, desktop computer, tablet computer, server, medical device, smartwatch, Internet Protocol (IP) camera, Internet of Things (IoT) device, and the like, having a network interface configured to connect to a network (e.g., the network 110).

The inference generator 130 is configured to infer device types based on port usage as described herein. To this end, the inference generator 130 may be configured to train machine learning models using data stored in the data sources 140, to apply the machine learning models to data stored in the data sources 140, or both. The data includes or can be used to extract features to be used as training data for training the machine learning models described herein. More specifically, such data includes device activity data indicating information such as, but not limited to, manufacturer data, ports used by devices, volumes of traffic transmitted to and from ports, combinations thereof, and the like.

In some embodiments, the inference generator 130 is configured to generate a device profile including the inferred device type or to add the inferred device model to a device profile. In a further embodiment, the inference generator 130 is configured to monitor activity of the device 120 in order to mitigate any potentially malicious behavior by the device 120, to mitigate any potential vulnerabilities of the device 120, or both. Such potentially malicious behavior or potential vulnerabilities may be detected as anomalies in behavior based on the device profile and behavior of the device, device configuration, or both. Alternatively, the inference generator 130 may send the inferred device model or the device profile including the inferred device model to an optional cybersecurity tool 150.

It should be noted that the network diagram shown in FIG. 1 is merely illustrative and that the disclosed embodiments do not require the particular network setup shown therein. As a particular example, the training using data stored in the data sources 140 may be performed offline (i.e. not while connected to the Internet and/or other networks), and the inference generator 130 may not be connected to the data sources 140 via the network 110 or may not be communicatively connected to the data sources 140 via the network 110 at the same time as it is communicatively connected to one of the devices 120. Further, the inference generator 130 may be communicatively connected to one of the devices 120 but not the other.

Figure 2:
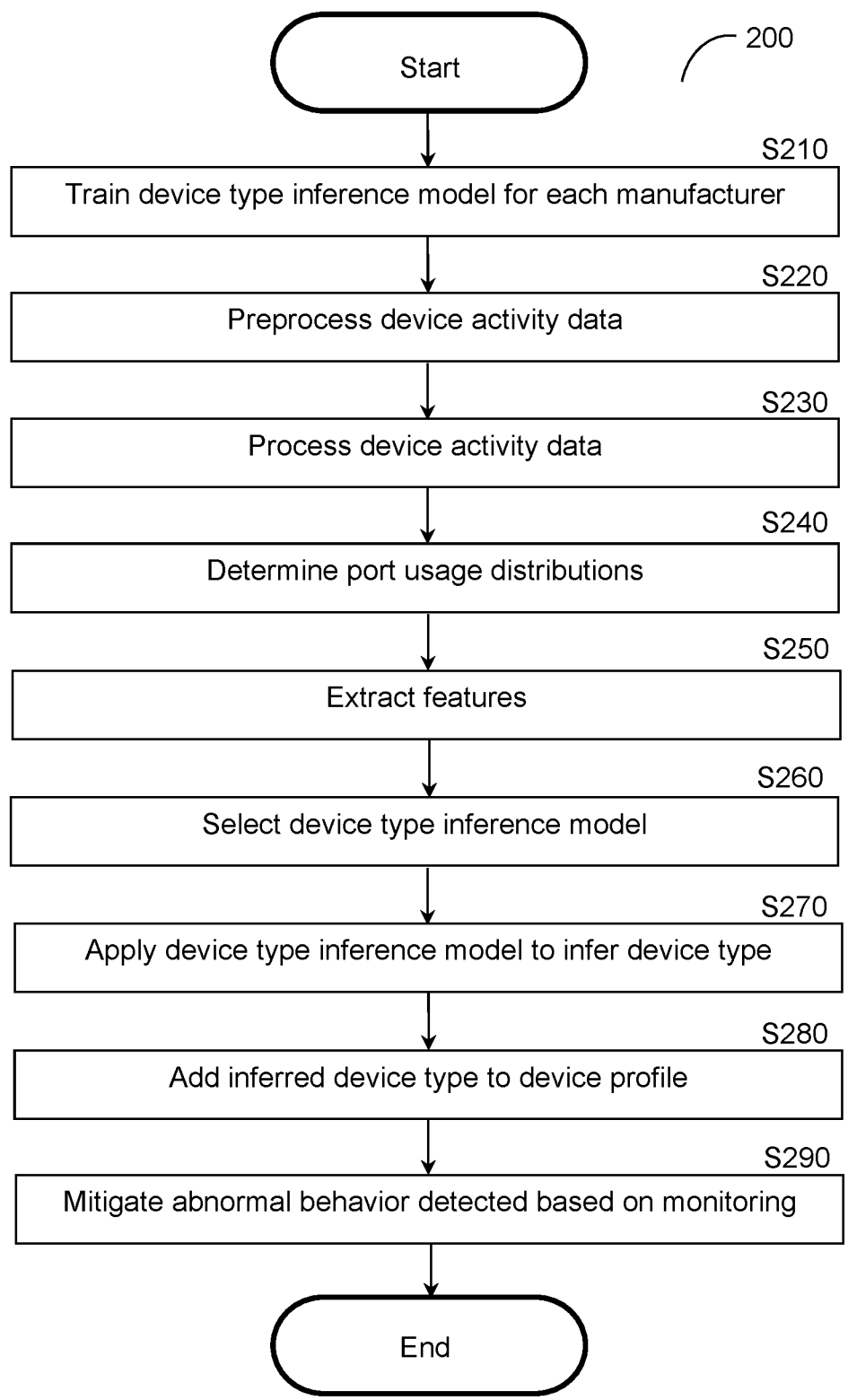
FIG. 2 is a flowchart illustrating a method for inferring device types using machine learning according to an embodiment.

FIG. 2 is a flowchart 200 illustrating a method for inferring device types using machine learning according to an embodiment. In an embodiment, the method is performed by the inference generator 130, FIG. 1.

At S210, a device type inference model is trained for each of multiple manufacturers. Each device type inference model is trained using training device activity data for devices of a respective manufacturer, and is trained to output a device type prediction for a device when applied to features extracted from application device activity data. The device type prediction may include a predicted class (i.e., a class representing a device type), or may include a prediction probability for each potential class (i.e., a probability that the respective device type for each potential class of the device type inference model is the correct device type for a device).

More specifically, the device type inference models are trained and applied based on port usage features including ports used by devices and volume of traffic each port is used for. In this regard, it is noted that different types of devices made by the same manufacturer tend to use the same ports for the same traffic. Accordingly, training these models per manufacturer for different ports and volumes of traffic communicated via ports allows for accurately identifying device type for devices of each manufacturer.

In an embodiment, each device type inference model is a classifier configured to output a class representing a respective device type. Moreover, in a further embodiment, each device type inference model may be a boosting ensemble configured for boosted learning using multiple sub-prediction models (e.g., an ensemble of weaker prediction models). As a non-limiting example each device type inference model may be configured to learn via gradient boosting.

In various embodiments, S210 may further include processing data to be used for preparing training data sets, for example, as described further below with respect to FIG. 3. Further, S210 may also include determining distribution similarity features for the training data sets. Such distribution similarity features for the training data sets may be determined similarly to as described below with respect to S240.

At S220, device activity data related to one or more devices is preprocessed. The preprocessing may be performed in order to obtain the relevant manufacturer data for each of the devices to be utilized for selecting an appropriate device type inference model to apply to the device activity data. To this end, the preprocessing may include, but is not limited to, normalizing manufacturer values representing the manufacturer of the device. The device activity data includes data related to activity by the devices such as, but not limited to, sessions data for sessions each device engages in.

In an embodiment, S220 may further include grouping devices with respect to manufacturer (i.e., grouping together devices with the same manufacturer as indicated by the manufacturer values). In a further embodiment, manufacturers whose total device count is below a threshold may be grouped into an "OTHER" category, and one of the device type inference models may be an "OTHER" model trained based on device activity data from various manufacturers that is applied to devices grouped into such an "OTHER" category. This allows for processing device activity of devices made by manufacturers who are not represented by one of the existing device type inference models. Accordingly, the grouped device activity data may be utilized during subsequent processing.

At S230, the device activity data is processed. The processing may be performed in order to prepare the data for feature extraction, and may at least partially be based on the groupings established at S220. In an embodiment, the device activity data is processed as described further below with respect to FIG. 3.

At S240, port usage distributions are determined based on the device activity data. The port usage distributions may be calculated both for incoming sessions data (i.e., sessions data for traffic coming into the port) and outgoing sessions data (i.e., sessions data for traffic going out of the ports). Each port usage distribution indicates the relevant volumes of traffic for each port. As noted above, devices having different device types tend to use ports differently, and this is often reflected by differences in the volumes of traffic each port is used for. Thus, inferring device type based on port usage distributions and machine learning allows for accurately inferring device types without requiring explicit rules about how to infer device types.

In some embodiments, each port usage distribution may be assigned a weight based on its session count such that port usage distributions determined based on higher numbers of sessions are weighted higher during subsequent processing.

At S250, features are extracted from the device activity data. In an embodiment, the extracted features include at least features indicating ports used by a device and one or more volumes of traffic for which each port is used by the device. In a further embodiment, the extracted features may also include traffic features such as, but not limited to, median daily counts of traffic data units (e.g., bytes) per device within a period of time for both incoming and outgoing sessions.

In an embodiment, the extracted features further include distribution similarity features. More specifically, for each device, a set of distribution similarity features is determined with respect to a similarity of port usage distribution of that device to port usage distributions of known device types for different manufacturers. To this end, in an embodiment, S250 may include applying a distribution dissimilarity model to port distribution data (e.g., the port usage distributions determined at S240) indicating at least port usage by the device. The distribution dissimilarity model outputs a plurality of distances, where each distance is based on a difference between a distribution of values of each port field indicated in the port distribution data and a distribution of a corresponding port field of each of the device types (i.e., the potential device types represented by respective classes capable of being output by the device type inference models).

At S260, a device type inference model is selected for a given device. In an embodiment, the device type inference model is selected based on a manufacturer of the device for which device type is to be inferred. Such a manufacturer may be indicated explicitly, for example, by a manufacturer value among the device activity data, or may be determined based on the device activity data or other data related to the device.

At S270, the selected device type inference model is applied to the extracted features for the device. As noted above, the output of the device type inference model may be an inferred device type or a set of probabilities for each potential device type that can be output by the device type inference model. When the output of the device type inference model is a set of probabilities, the device type with the highest probability may be determined as the inferred device type for the device. Further, in some implementations, only a device type having a probability above a threshold is determined as the inferred device type; otherwise a null result is returned.

At S280, the inferred device type determined at S270 is added to a device profile for the device. In an embodiment, S280 may include creating the device profile using portions of the device activity data or adding the inferred device type to an existing device profile for the device.

At S290, abnormal behavior of the device may be mitigated by monitoring for such abnormal behavior. The monitoring may be based on the device profile including the inferred device type or otherwise based on the inferred device type. More specifically, in an embodiment, activity of the device is monitored to identify abnormal behavior for the device based on the inferred device type. In a further embodiment, the abnormal behavior is a deviation from a predetermined normal behavior associated with the inferred device type.

When abnormal behavior of the device is detected, the abnormal behavior may be mitigated by performing one or more mitigation actions. Such mitigation actions may include, but are not limited to severing a connection of the device from one or more networks, restricting traffic to or from the device, and the like.

It should be noted that FIG. 2 is depicted as having distinct training and test phases merely for simplicity and without limiting the disclosed embodiments. A set of device activity data may be used both for training and prediction in accordance with various disclosed embodiments, and at least part of the training and test phases may be performed in parallel (for example, preprocessing, processing, feature extraction, etc.). As noted below with respect to FIG. 3, different preprocessing and processing steps may be utilized when preparing training sets as compared to when preparing test sets. For example, filtering may be performed for data used to prepare training data sets.

Figure 3:
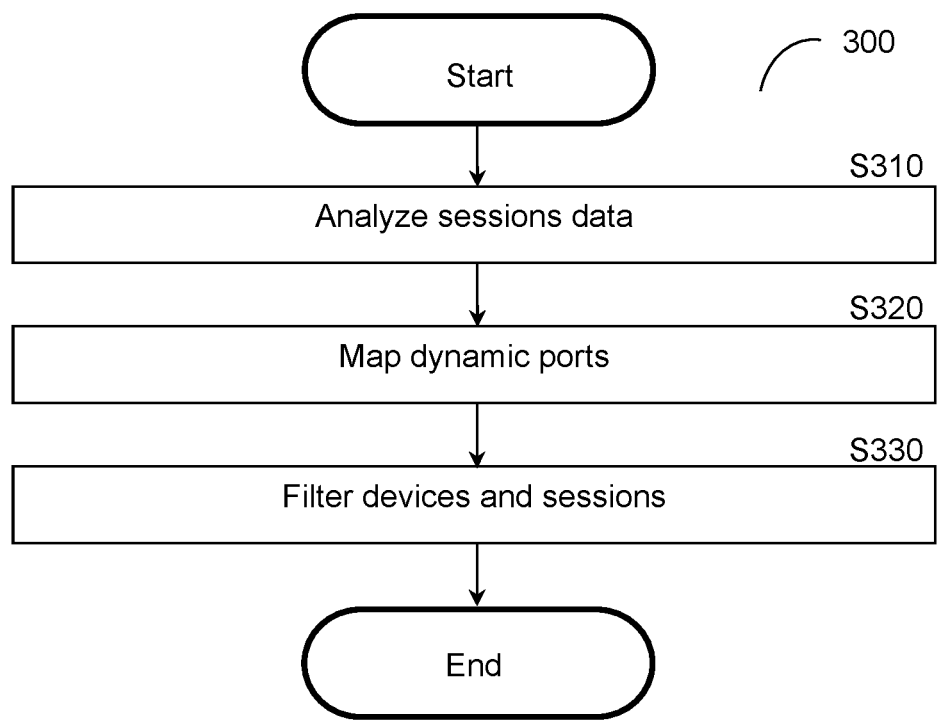
FIG. 3 is a flowchart illustrating a method for processing device activity data according to an embodiment.

FIG. 3 is a flowchart 300 illustrating a method for processing device activity data according to an embodiment. The method of FIG. 3 may be utilized to prepare training data sets, test data sets, or both, which can be utilized as described above with respect to FIG. 2.

At S310, sessions data is analyzed for devices grouped into each manufacturer. The sessions data may be analyzed in order to identify, for example, ports used by each device, and information regarding traffic coming in to and going out of each port when used by each device.

At S320, dynamic ports are mapped into a unified port value. As a non-limiting example, ports having a value exceeding 49151 may be determined to be dynamic such that all ports having such a value exceeding 49151 are determined as relating to the same port. To this end, in an embodiment, S320 includes applying dynamic port identification rules defining conditions for identifying a dynamic port.

In this regard, it is noted that some port values are allowed predesignated ranges of values for use as dynamic ports, i.e., ports who are assigned to a process or service only as needed and whose values change such that those values do not necessarily reflect a particular port. In some cases, an upper end of potential port values is reserved for dynamic ports. Mapping dynamic ports into a unified port value allows for improving the representation of port distributions, namely, allowing for determining distributions that are not skewed by the unusual port values which may be utilized by dynamic ports.

At optional S330, devices and their respective sessions indicated in the sessions data may be filtered from data to be used for preparing test or training data sets. The filtering may be performed to remove or otherwise regroup data to be used for training device type inference models, thereby further improving the accuracy of device type inferences determined using those models.

In an embodiment, the filtering may be at least partially based on aggregate session count within a predetermined period of time (e.g., filtering devices with a number of sessions below a predetermined threshold). The result of this fielding is a set of incoming and outcoming sessions for each device with at least a threshold number of sessions. As noted below, in various embodiments, distributions of port usage are determined and utilized for device type inference. To this end, filtering devices without a sufficient number of sessions increases accuracy of device type classification since low sample sizes may result in skewed or otherwise misleading distributions, which in turn results in lower accuracy models.

In a further embodiment, when using device activity data to create training data sets, devices that are filtered out at S330 may be regrouped and mapped to an "OTHER"

category such that an "OTHER" device type inference model is trained using features extracted from data for those devices.

In another embodiment, S330 may include applying a blacklist of device category or type values such that devices having blacklisted values are excluded from subsequent processing.

In yet another embodiment, when using device activity data to create training data sets, manufacturers for which only a single device has a corresponding manufacturer value may be filtered out and excluded from subsequent processing.

Figure 4:
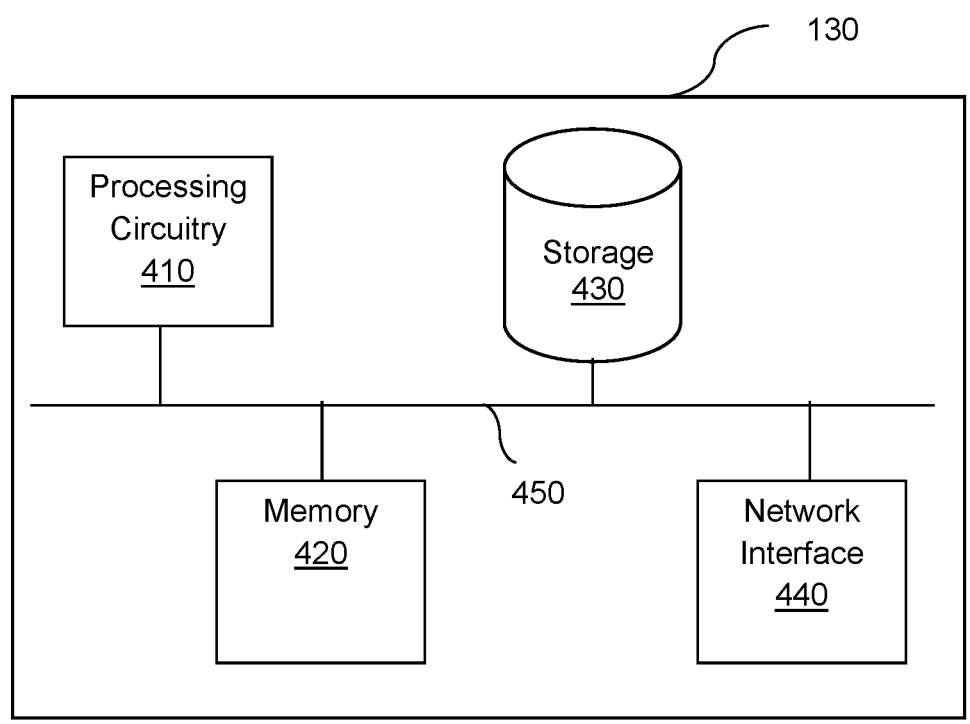
FIG. 4 is a schematic diagram of an inference generator according to an embodiment.

FIG. 4 is an example schematic diagram of an inference generator 130 according to an embodiment. The inference generator 130 includes a processing circuitry 410 coupled to a memory 420, a storage 430, and a network interface 440. In an embodiment, the components of the inference generator 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the inference generator 130 to communicate with the data sources 140 for the purpose of, for example, retrieving device activity data. The network interface 440 also allows the inference generator to communicate with one or more of the devices 120 for the purpose of intercepting packets, performing mitigation actions, and the like.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for inferring device types, comprising:
selecting a manufacturer-specific device type inference model from among a plurality of device type inference models based on a manufacturer of a device, wherein each device type inference model corresponds to a respective manufacturer and is trained using training data of devices manufactured by the respective manufacturer, wherein each device type inference model is trained to output a device type prediction;
determining, from device activity data of the device, a port usage distribution indicating traffic volumes for each port used by the device, wherein the device activity data indicates ports used by the device and at least one volume of traffic communicated via each port used by the device;

extracting a plurality of features from device activity data of the device and the port usage distribution; and determining an inferred device type for the device, wherein determining the inferred device type for the device further comprises applying the selected manufacturer-specific device type inference model to the extracted plurality of features.

2. The method of claim 1, wherein determining the distribution of port usage further comprises:

applying a distribution dissimilarity model to the port usage distributions, wherein the distribution dissimilarity model outputs a plurality of distances, wherein each distance is based on a difference between a distribution of values for each port indicated in the port usage distribution and a distribution of values for each corresponding port of each of a plurality of device types capable of being output by the selected manufacturer-specific device type inference model, wherein the extracted plurality of features includes the plurality of distances.

3. The method of claim 1, further comprising:

adding the inferred device type for the device to a device profile of the device.

4. The method of claim 1, further comprising:

normalizing a plurality of manufacturer values among the device activity data, wherein the manufacturer of the device is determined based on the normalized plurality of manufacturer values.

5. The method of claim 1, further comprising:

determining a manufacturer of the device based on the device activity data, wherein the respective manufacturer for each of the plurality of device type inference models is the determined manufacturer.

6. The method of claim 1, further comprising:

monitoring behavior of the device with respect to the inferred device type in order to detect at least one abnormal behavior of the device.

7. The method of claim 6, wherein the abnormal behavior is a deviation from a predetermined normal behavior associated with the inferred device type.

8. The method of claim 6, further comprising:

performing at least one mitigation action based on the detected at least one anomaly in behavior of the device.

9. A non-transitory computer readable medium having stored thereon instructions for causing a processing circuitry to execute a process, the process comprising:

selecting a manufacturer-specific device type inference model from among a plurality of device type inference models based on a manufacturer of a device, wherein each device type inference model corresponds to a respective manufacturer and is trained using training data of devices manufactured by the respective manufacturer, wherein each device type inference model is trained to output a device type prediction;

determining, from device activity data of the device, a port usage distribution indicating traffic volumes for each port used by the device, wherein the device activity data indicates ports used by the device and at least one volume of traffic communicated via each port used by the device;

extracting a plurality of features from device activity data of the device and the port usage distribution; and determining an inferred device type for the device, wherein determining the inferred device type for the device further comprises applying the selected manufacturer-specific device type inference model to the extracted plurality of features.

10. A system for inferring device types, comprising:

a processing circuitry; and a memory, the memory containing instructions that, when executed by the processing circuitry, configure the system to:

select a manufacturer-specific device type inference model from among a plurality of device type inference models based on a manufacturer of a device, wherein each device type inference model corresponds to a respective manufacturer and is trained using training data of devices manufactured by the respective manufacturer, wherein each device type inference model is trained to output a device type prediction;

determine, from device activity data of the device, a port usage distribution indicating traffic volumes for each port used by the device, wherein the device activity data indicates ports used by the device and at least one volume of traffic communicated via each port used by the device;

extract a plurality of features from device activity data of the device and the port usage distribution; and determine an inferred device type for the device, wherein determining the inferred device type for the device further comprises applying the selected manufacturer-specific device type inference model to the extracted plurality of features.

11. The system of claim 10, wherein the system is further configured to:

apply a distribution dissimilarity model to the port usage distributions, wherein the distribution dissimilarity model outputs a plurality of distances, wherein each distance is based on a difference between a distribution of values for each port indicated in the port usage distribution and a distribution of values for each corresponding port of each of a plurality of device types capable of being output by the selected manufacturer-specific device type inference model, wherein the extracted plurality of features includes the plurality of distances.

12. The system of claim 10, wherein the system is further configured to:

add the inferred device type for the device to a device profile of the device.

13. The system of claim 10, wherein the system is further configured to:

normalize a plurality of manufacturer values among the device activity data, wherein the manufacturer of the device is determined based on the normalized plurality of manufacturer values.

14. The system of claim 10, wherein the system is further configured to:

determine a manufacturer of the device based on the device activity data, wherein the respective manufacturer for each of the plurality of device type inference models is the determined manufacturer.

15. The system of claim 10, wherein the system is further configured to:

monitor behavior of the device with respect to the inferred device type in order to detect at least one abnormal behavior of the device.

16. The system of claim 15, wherein the abnormal behavior is a deviation from a predetermined normal behavior associated with the inferred device type.

17. The system of claim 15, wherein the system is further configured to:
  perform at least one mitigation action based on the detected at least one anomaly in behavior of the device.

* * * * *